United States Patent [19]

Kato et al.

[11] Patent Number: 4,696,846
[45] Date of Patent: Sep. 29, 1987

[54] METHOD FOR FORMING PROTECTIVE LAYER ON A FLEXIBLE MAGNETIC DISC SHEET

[75] Inventors: Mikihiko Kato; Shigeo Komine; Kazuhiko Morita; Yasutoshi Okuzawa, all of Kanagawa, Japan

[73] Assignee: Fuji Photo Film Co., Ltd., Kanagawa, Japan

[21] Appl. No.: 891,070

[22] Filed: Jul. 31, 1986

Related U.S. Application Data

[62] Division of Ser. No. 658,712, Oct. 9, 1984, Pat. No. 4,647,473.

[30] Foreign Application Priority Data

Oct. 7, 1983 [JP] Japan .................. 58-188221

[51] Int. Cl.[4] .............................................. G11B 5/72
[52] U.S. Cl. ................................ 428/65; 427/214; 427/54.1; 427/128; 427/131; 428/212; 428/216; 428/137; 428/195; 428/694; 428/695; 428/900
[58] Field of Search ............... 427/44, 54.1, 128, 131; 428/694, 695, 64, 65, 900, 137, 195, 212, 216; 360/134–136

[56] References Cited

U.S. PATENT DOCUMENTS

| | | | |
|---|---|---|---|
| 3,466,156 | 9/1969 | Peters | 427/132 |
| 3,681,225 | 8/1972 | Genma | 427/132 |
| 4,239,828 | 12/1980 | Knope | 428/64 |
| 4,335,183 | 6/1982 | Hosaka | 428/694 |
| 4,368,239 | 1/1983 | Nakajima | 428/900 |
| 4,387,114 | 7/1983 | Conner | 427/54.1 |
| 4,404,247 | 9/1983 | Dominguez-Burquette | 428/64 |
| 4,434,210 | 2/1984 | Nakajima | 427/44 |
| 4,486,500 | 12/1984 | Naruo | 427/54.1 |
| 4,523,246 | 6/1985 | Okuzawa | 428/694 |
| 4,539,220 | 9/1985 | Martinelli | 427/54.1 |
| 4,578,299 | 3/1986 | Kato | 428/65 |
| 4,581,270 | 4/1986 | Kato | 428/65 |
| 4,652,480 | 3/1987 | Kato | 428/65 |

Primary Examiner—Ellis P. Robinson
Attorney, Agent, or Firm—Sughrue, Mion, Zinn, Macpeak, and Seas

[57] ABSTRACT

A method for forming protective layer on a surface portion surrounding the edge of a central aperture of a flexible magnetic disc sheet is described, comprising providing a radiation polymerizable composition on a surface portion surrounding the edge of the central aperture of the flexible magnetic disc sheet by screen printing, and hardening the composition by exposure to radiation; a flexible magnetic disc is also described, wherein a protective layer by the foregoing method is provided, with said protective layer having an inner diameter larger than the diameter of the aperture of the disc sheet and an outer diameter smaller than the diameter of the aperture of a jacket enclosing the disc sheet.

4 Claims, 9 Drawing Figures

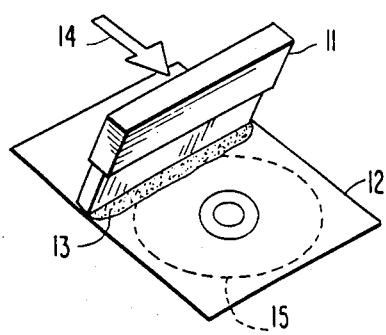
FIG. 5
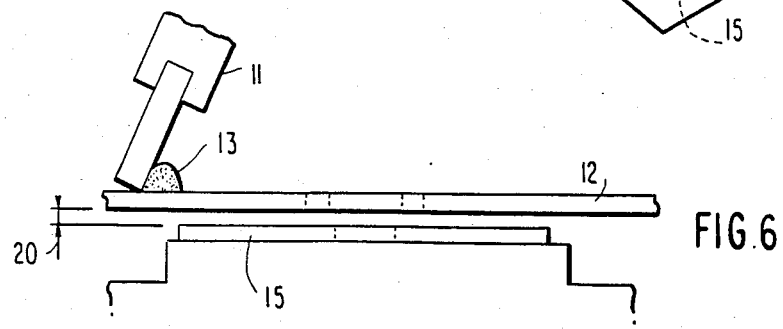
FIG. 6
FIG. 7
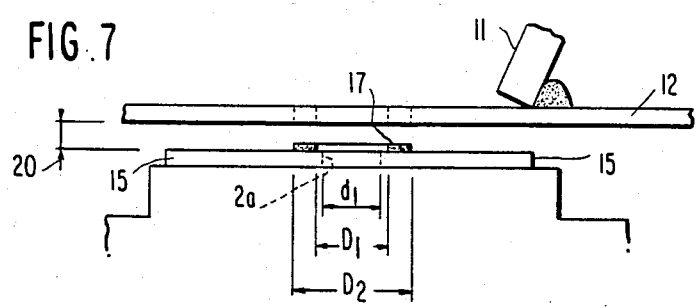
FIG. 8
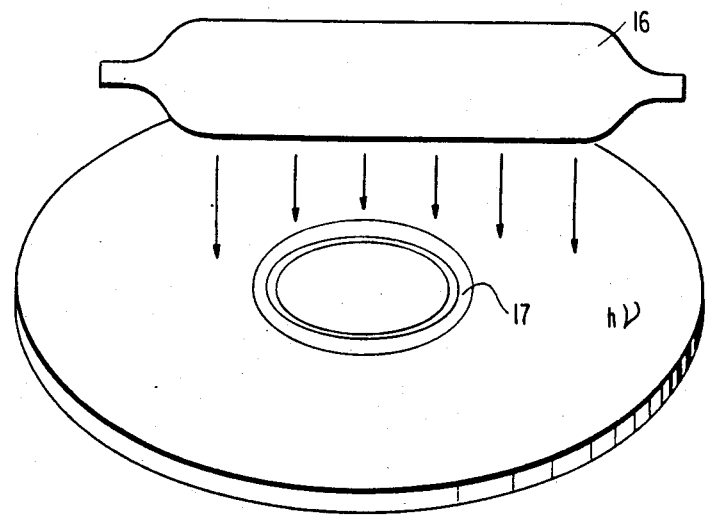

METHOD FOR FORMING PROTECTIVE LAYER ON A FLEXIBLE MAGNETIC DISC SHEET

This is a division of application Ser. No. 658,712 filed Oct. 9, 1984, now U.S. Pat. No. 4,647,473.

FIELD OF THE INVENTION

The present invention relates to a flexible magnetic disc, comprising a flexible magnetic disc sheet and a jacket, and more particularly relates to a method for forming an improved protective layer on a surface portion of the flexible magnetic disc sheet surrounding the edge of a central aperture thereof.

BACKGROUND OF THE INVENTION

Magnetic recording and playing of a magnetic signal in a flexible magnetic disc comprising a sheet in a jacket, involving connecting a sheet-position determining part of a writing and/or reading apparatus to a central aperture of the jacket and sheet, and rotating the sheet, is known, and the magnetic disc is commonly called a "floppy disc". For the sheet to be stored in the jacket, a space is provided in the magnetic disc which is slightly larger than the sheet, and thus the sheet sometimes moves to an eccentric position in the jacket during use or storage, with the result that the central aperture of the sheet deviates from the position of a position-determining part (collet) of the apparatus when the disc is loaded on the apparatus, and the sheet may be supported at an eccentric position at the position determing time.

FIG. 1A and FIG. 1B illustrate this type of flexible magnetic sheet, located in a rectangular jacket 1 having circular open part 1a, with circular flexible magnetic sheet 2 having central aperture 2a thereof exposed in the afore-mentioned central circular open part 1a, said sheet being stored in the jacket to allow free rotation.

Upon loading this flexible magnetic disc on the writing and/or reading apparatus, rotating part 3 (see FIGS. 2-4) of the position-determining part is fitted from under part of the sheet 2, and collet 4 is lowered from upper part of the sheet and is brought into the circular concave part 3a of rotating part 3 as shown in FIG. 2. At this time, the edge of central aperture 2a does not always correspond to the position of circular concave part 3a of rotating part 3, and is many times out of proper alignment. If collet 4 is lowered in this state, some part of the portion surrounding the edge of aperture 2a of the sheet 2 may be pinched between collet 4 and concave part 3a of rotating part 3, such that the sheet rotates eccentrically. As writing and reading cannot be carried out correctly unless magnetic disc sheet 2 rotates while being correctly centered corresponding to the central rotating axis, such eccentric pinching should very desirably be prevented. Moreover, there exists another problem, viz., that rattling occurs during rotation due to the absence of planarity of the sheet 2 when it is supported and rotated under such an eccentric pinched state.

Upon connecting the sheet 2 by lowering the collet 4, it is necessary that the portion surrounding the edge of the central aperture of the sheet possesses an appropriate hardness, and that the friction coefficient ($\mu$) between the sheet 2 and collet 4 as well as between the sheet 2 and rotating part 3 is small, in order that the sheet 2 is loaded correctly as shown in FIG. 4, not as shown in FIG. 3.

It has been proposed to adhere an annular reinforcement member (ring) concentrically arranged adjacent central aperture of the disc sheet, as described in U.S. Pat. No. 4,052,750, in order to overcome such problems. However, this method has a problem in that an adhesive comes out and the collet stains where the sheet is used for a long period of time, resulting in incorrect writing and reading.

It has been known that a UV (ultraviolet ray) hardenable resin can be applied to a surface of a disc sheet around the central aperture by a tampon printing method, and then hardened to provide a protective layer, as described in U.S. Pat. No. 4,387,114. This protective layer formed by the UV hardening resin does not involve the problem that an adhesive comes out therefrom, but the method requires two step printing operations, and printing accuracy is low.

SUMMARY OF THE INVENTION

Therefore, a first object of this invention is to provide a flexible magnetic disc sheet having a protective layer about the central aperture thereof and a small coefficient of friction with respect to a position-determining means, and which can be correctly entered and engaged in a writing and reading apparatus.

A second object of this invention is to provide an economical method for forming a protective layer about a central aperture of a flexible magnetic disc sheet.

A third object of this invention is to provide a method for efficiently forming a protective layer on a flexible magnetic disc sheet by a single step.

A fourth object of the invention is to provide a method for accurately forming a protective layer on a flexible magnetic disc sheet.

As a result of extensive research on methods for forming protective layers on flexible magnetic disc sheets, it has now been found that an improves protective layer can be obtained without being accompanying by the above problems by using a screen printing method.

Particularly, the above objects of the invention can be attained by a method for forming a protective layer on a surface portion surrounding the edge of a central aperture of a flexible magnetic disc sheet, which comprises providing a radiation polymerizable composition around a central aperture of the disc by screen printing, and hardening the composition by exposure to radiation.

The above objects of the invention are also attained by a flexible magnetic disc comprising a flexible magnetic disc sheet and a jacket enclosing said disc sheet, wherein both of said disc sheet and said jacket have central apertures, and the diameter of the aperture of said jacket is larger than the diameter of the aperture of said disc sheet, with a protective layer provided on a surface portion surrounding the edge of the aperture of the disc sheet, and said protective layer has an inner diameter larger than the diameter of the central aperture of the disc and an outer diameter smaller than a diameter of the aperture of the jacket enclosing the disc sheet, and said protective layer is formed by screen-printing a radiation polymerizable composition on said surface portion surrounding the edge of the aperture of the disc sheet and hardening the composition by exposure to radiation.

BRIEF DESCRIPTION OF THE DRAWINGS

FIGS. 5 and 6 are illustrative views showing embodiments before a screen printing.

FIG. 7 is an illustrative view showing an embodiment after a screen printing.

FIG. 8 is an illustrative view showing a disc sheet exposed to a mercury lamp after a screen printing.

DETAILED DESCRIPTION OF THE INVENTION

Figure 1A:
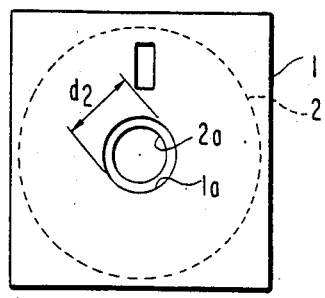
FIG. 1A is a schematic view depicting a flexible magnetic disc sheet in a jacket.
Figure 1B:
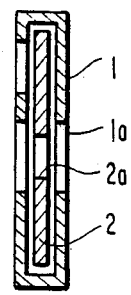
FIG. 1B is a cross-sectional view of FIG. 1A.
Figure 2:
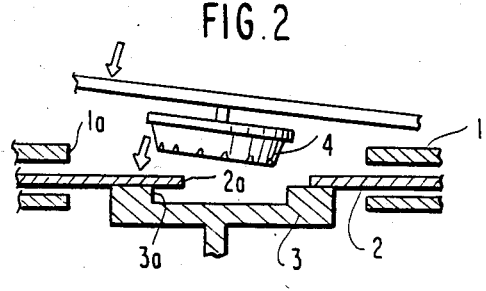
FIGS. 2 and 3 are cross-sectional views illustrating the situation wherein the central aperture of a disc sheet is not in alignment with a collet of a writing and reading apparatus.
Figure 3:
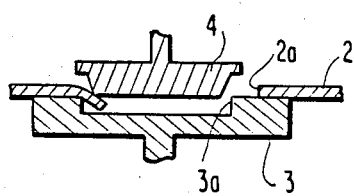
Figure 4:
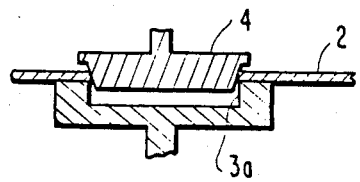
FIG. 4 is a cross-sectional view illustrating the situation wherein the central aperture of a disc sheet is correctly in alignment with a collet of a writing and reading apparatus.

"Screen printing" according to this invention is a method for printing an ink through a screen (e.g., silk screen, paint screen, or stencil screen) onto a surface to be printed under pressure by means of a rubber squeegee.

According to one embodiment of the method in the invention, a screen printing can be conducted by superposing a screen on a central sperture of flexible magnetic disc, supplying a radiation polymerizable resin composition there on, and spreading it by a squeegee, followed by exposure to radiation to harden the printed composition and to provide a protective layer on a surface portion surrounding the edge of the aperture of flexible magnetic disc sheet.

The radiation used according to this invention includes a low energy radiation ray such as ultraviolet rays, and high energy radiation such as α-rays, X-rays, and electron beams. Among them, ultraviolet rays are preferred, because an apparatus for generating ultraviolet rays is simpler.

A radiation polymerizable resin composition can include a ultraviolet exposure polymerizable resin composition such as a so-called UV ink.

Examples of the UV ink include compounds having at least one carbon-carbon unsaturated bond, such as an acryloyl group, acrylamide group, allyl group, vinylether group or vinyl thioether group, or unsaturated polyester. Typical examples of the compounds are methylacrylate and its homologous (alkyl acrylate), styrene and its homologous (e.g.α-methylstyrene, β-chlorostyrene etc.), acrylonitrile, vinyl acetate and vinyl propionate. Such compounds are disclosed in Data of Light-Sensitive Resins, pages 235 to 236 (December, 1968) published by Sogo Kagaku Kenkyusho. More preferred compounds are unsaturated esters of polyols (e.g., ethylene diacrylate, diethylene glycol diacrylate, glycerol triacrylate or pentaerythritol tetraacrylate) and glycidyl acrylates having an epoxy ring. A mixture of a compound having one unsaturated bond in the molecule and a compound having two or more unsaturated bonds in the molecule can be used.

These compounds may be polymeric, and more particularly include a polymeric compound having an acrylate group in the main chain or side chain as disclosed in A. Vrancken, Fatipec Congress, Vol. 11 page 19 (1972). Typical examples of the polymeric compounds include a compound represented by the following formula.

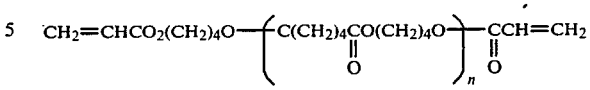

In the formula, the polyester structure can be replaced by a polyurethane structure, an epoxy structure, a polyether structure, a polycarbonate structure, or a mixture thereof. The molecular weight of the compounds is not limited, but is generally from 1,000 to 20,000. The polymeric compounds can be used in combination with the above monomers.

The above radiation hardenable compounds are generally provided around a central aperture of the disc sheet in a thickness of from 1 to 50 $\mu$m, preferably from 2 to 15 $\mu$m and more preferably from 3 to 7 $\mu$m.

The above compounds are polymerizable by UV rays when a photopolymerization initiator is employed together.

The photopolymerization initiator includes an aromatic ketone such as benzophenone, benzoin ethyl ether, benzyl methyl. ketal, 1-hydroxycyclohexyl phenyl ketone, or Michler's ketone. Preferred photopolymerizable initiators have larger extinction coefficient at the wavelength of 254 nm, 313 nm and 365 nm which are bright line spectrum of mercury lamp employed as a light source of ultraviolet rays exposure. A commercially available photopolymerizable initiator that can be used is "Irgacure-651", manufactured by Ciba-Gaigy Co., Ltd. The photopolymerization initiator is generally used in an amount of from 0.5 to 20 parts by weight, preferably from 2 to 15 parts by weight, more preferably from 3 to 7 parts by weight, per 100 parts by weight of the radiation hardenable compound.

To the UV ink employed in the invention, additives such as antifoaming agents, waxes, levelling agents, lubricants, thixotropic agents, stabilizers, etc., can be added. A viscosity of the UV ink is preferably from 5 cps to 200 ps, and more preferably from 1 to 100 ps. If the viscosity is too high, foaming, showing of the mesh pattern of the screen, thinning and spoting occur, and if it is low, blurring occurs.

The screen used in the invention is composed of a frame provided with a nylon cloth or silk cloth and having an ink-passing pattern, which can be formed by (1) a cutting method, (2) a drawing method, (3) a photography method as disclosed in "Technique for Making Lithographic or Intaglio Printing Plate and Printing Technique" in Insatsu Sheihan Gijutsu Koza, pages 289–293, 2nd edit., published by Kyoritsu Shuppan Co. (1964).

Materials for the screen used in this invention is not limited, and includes polyester, nylon, and stainless steel. The size of screen mesh can be determined by the thickness of protective layer to be provided on the disc sheets, and generally is from 200 to 500 mesh (Tyler standard sieve). Where the thickness of a protective layer is desired to be from 3 to 7 $\mu$m, the mesh of screen is preferably from 270 to 380 mesh.

The function of the squeegee is same as that of a roller in stencil printing, that is, the squeegee is used to spread and press a resin composition onto a surface of a screen.

Materials for the squeegee used in the practice of the invention should have an anti-swelling property, anti-abrasion property and elasticity to the UV ink, and such materials include a synthetic rubber and a natural rubber and, more preferably, a natural rubber. Hardness of the materials is 65 to 80 degree as HS (Shore) hardness.

The method of this invention is now explained in more detail referring to FIGS. 5 to 8.

FIGS. 5 and 6 are illustrative views showing embodiments before a screen printing. A screen 12 having a pattern to be printed is aligned with a central aperture of a flexible magnetic disc sheet 15, a radiation polymerizable resin composition 13 is supplied on the screen 12, and the resin composition 13 is spread in the direction of arrow 14 under pressure of squeegee 11.

A clearance 20 between the screen 12 and the flexible magnetic disc sheet 15 is preferably from about 0.5 mm to 3 mm. Where the clearance 20 is smaller, the screen 12 is not effectively contacted with the flexible magnetic disc 15, and where the clearance 20 is larger, the printing dimensions and accuracy are lowered, and foam may be formed on the printed surface of the disc sheet. The most preferred clearance is from 1 to 2 mm.

The angle of the squeegee to the screen is preferably from 45° to 60°. Where the angle is smaller, the printed surface tends to be blurred.

The printing speed is generally from 0.5 to 100 m/min., and preferably from 1 to 30 m/min. Where the printing speed is slower, thinning or spot generation occurs on the printed surface.

As the pressure of the squeegee is increased, blurring of the printed ink tends to occur, and as the pressure is lowered, thinning and spotting tend to occur.

FIG. 7 is an illustrative view showing an embodiment after screen printing. A resin composition 13 is spread by a squeegee, whereby the resin composition is printed in a ring form 17 around a central aperture $2a$ of flexible magnetic disc sheet 15.

Dimensional relationship of $D_1$, $D_2$, $d_1$ and $d_2$ is as follows:

Inner diameter ($D_1$) of printed layer > Diameter ($d_1$) of the central aperture of the flexible magnetic disc sheet.

Outer diameter ($D_2$) of printed layer < Diameter ($d_2$) of central aperture of the jacket. ($d_2$ illustrated in FIG. 1A)

In order to protect the UV ink during the printing step from oozing to the central aperture, and to protect the central aperture of discs after hardening step from dimensional change, $D_1 > d_1$ is necessary and it is preferred that ($D_1 - d_1$) is less than 2 mm and more than 0.5 mm.

FIG. 8 is an illustrative view showing an embodiment wherein the radiation hardenable resin composition printed in the ring form 17 is hardened by exposure to radiation. Where the radiation is an ultraviolet ray, a mercury lamp 16 is used as a light source.

As UV providing lamps, there can be employed an ultrahigh pressure mercury lamp, a high pressure mercury lamp, a middle pressure mercury lamp, a low pressure mercury lamp, a xenon lamp, and a metal halide lamp. A high pressure mercury lamp having larger extinction coefficient at the wavelengths of 254, 313, and 365 nm, is most preferred.

There are two general types of mercury lamp. One is ozone type capable of generating ozone and the other is ozoneless type incapable of generating ozone. The ozone type is better because strength in the short wavelength (not more than 300 nm) is higher. The power of the lamp is preferably from 10 to 200 Watt/cm, and more preferably about 80 Watt/cm. A distance between the lamp and the printed resin composition to be hardened can be determined so that the magnetic discs are not affected by heat, and is preferably from 10 to 30 cm. In order to prevent the disc sheet from being adversely affected due to heat, a heat-resisting filter can be provided, a cooling fan can be employed on the printed surface and a water-cooling type lamp can be used. Further, a heat-resisting type reflection mirror (cold mirror) can be employed as a lamp mirror. A quartz filter and a long wave length-cutting filter can be also used as a heat-resisting filter. Exposure time is preferably not more than 5 seconds.

EXAMPLE AND COMPARATIVE EXAMPLE

According to FIGS. 5 and 6, a UV ink having a viscosity of 30 ps and the following formulation was supplied on a nylon screen 12 having 380 mesh, a squeegee 11 made by a natural rubber was fixed at the angle of 45° to the screen 12, the clearance between the screen 12 and the flexible magnetic disc sheet (diameter: 5.25 inches) 15 was adjusted to 1.5 mm and then the ink was printed on the disc sheet 15 as shown in FIG. 7. Printing speed was 5 m/min.

| Formulation of UV ink: | |
|---|---|
| Urethane acrylate (trade name "M-1100" manufactured by Toa Gosei Chemical Industry Co., Ltd.) | 100 parts by weight |
| Photopolymerization initiator (trade name "Irgacure-651" manufactured by Chiba-Gaigy Co., Ltd.) | 5 parts by weight |
| Lubricant (myristic acid-modified silicone: trade name "TA-930 manufactured by Shinetsu Chemical Co., Ltd.) | 5 parts by weight |

The dimension of printed ring was that $D_1$ was 20 mm and $D_2$ was 24 mm.

Within 1 minute after printing, the printed resin composition was exposed to a high pressure mercury lamp 16 (trade name "HI-20N": ozone type: 2 KWatt: manufactured by Nippon Denchi Co., Ltd.) from a distance of 20 cm for 1 second, as shown in FIG. 8. A heat-resisting quartz filter and a cooling fan were used to protect the disc sheet from heat. The thickness of the hardened protective layer was 12 μm.

For the comparison, a flexible magnetic disc sheet having no protective layer was prepared.

Coefficient of friction between the disc sheets and the upper portion-determining means, and insertion test of the disc into disc drive at 25° C. and 80% RH are shown in the following Table.

The coefficient of friction was measured by contacting magnetic disc sheets with a position-determing means (collet) having a moving speed was 0.8 mm/sec and added weight was 70 g. The measurement of the coefficient of friction between the disc sheets and a position-determining means (rotating portion) was the same.

The disc drives employed for the insertion test were "YD-280" and "YD-380" manufactured by Y-E Data Co., Ltd. "JA 751" and "JA 561" manufactured by Matsushita Tsuuko Co., Ltd., and "M-2894" and "M-4853" manufactured by Mitsubishi Electric Co., Ltd.

The insertion test was repeated 10 times, and the evaluation was "A" where no error occurred in all drives, and "X" where error occurred in at least one drive.

TABLE

| | Coefficient of friction ($\mu$) | | Insertion test in disc drive |
|---|---|---|---|
| | To collet | To rotating portion | |
| Example | 0.32 | 0.24 | A |
| Comparative Example | 0.55 | 0.43 | X |

In view of the above results, a flexible magnetic disc having a protective layer formed by the method of the invention can be provided with a reduced coefficient of friction on a surface portion surrounding the edge of the central aperture thereof, and can be inserted into a disc drive apparatus without misalignment with a collet.

Furthermore, a protective layer can be provided about the central aperture of flexible magnetic discs accurately and efficiently by the method of the invention.

As described above, it can be understood by using the screen printing method of the invention that flexible magnetic discs having a reduced coefficient of friction with respect to the sheet position-determining means can be obtained by providing a protective layer on a surface portion surrounding the edge of the center aperture of the disc sheet, that the protective layer can be formed economically, and that a one step printing operation can be carried out to form a protective layer effectively.

While the invention has been described in detail and with reference to specific embodiments thereof, it will be apparent to one skilled in the art that various changes and modifications can be made therein without departing from the spirit and scope thereof.

What is claimed is:

1. A flexible magnetic disc comprising a flexible magnetic disc sheet and a jacket enclosing said disc sheet, wherein both of said disc sheet and said jacket have central apertures, and the diameter of the aperture of said jacket is larger than the diameter of the aperture of said disc sheet, with a protective layer provided on a surface portion surrounding the edge of the aperture of the disc sheet, and said protective layer has an inner diameter larger than the diameter of the aperture of the disc sheet and an outer diameter smaller than the diameter of the aperture of the jacket enclosing the disc sheet, and said protective layer is formed by screen-printing a radiation polymerizable composition on said surface portion surrounding the edge of aperture of the disc sheet and hardening the composition by exposure to radiation, wherein the flexible magnetic disc has the protective layer about the central aperture thereof and a small coefficient of friction with respect to a position-determining means.

2. A flexible magnetic disc as in claim 1, wherein said radiation polymerizable composition is an UV ink which comprises a compound having at least one carbon-carbon unsaturated bond.

3. A flexible magnetic disc as in claim 2, wherein said compound having at least one carbon-carbon unsaturated bond is a polymeric compound having an acrylate group in the main chain thereof or in a side chain thereof.

4. A flexible magnetic disc as in claim 1, wherein the difference between the inner diameter of the protective layer and the diameter of the aperture of the disc sheet is less than 2 mm and more than 0.5 mm.

* * * * *